United States Patent
Imai et al.

(10) Patent No.: US 11,487,258 B2
(45) Date of Patent: Nov. 1, 2022

(54) CONTROLLER AND CONTROL MANAGEMENT SYSTEM

(71) Applicant: Hitachi Industrial Equipment Systems Co., Ltd., Tokyo (JP)

(72) Inventors: Mitsuhiro Imai, Tokyo (JP); Ryo Hirana, Tokyo (JP); Fumiyuki Tamura, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 919 days.

(21) Appl. No.: 16/329,011

(22) PCT Filed: May 12, 2017

(86) PCT No.: PCT/JP2017/018125
§ 371 (c)(1),
(2) Date: Feb. 27, 2019

(87) PCT Pub. No.: WO2018/047412
PCT Pub. Date: Mar. 15, 2018

(65) Prior Publication Data
US 2019/0204801 A1 Jul. 4, 2019

(30) Foreign Application Priority Data
Sep. 9, 2016 (JP) .............................. JP2016-176877

(51) Int. Cl.
*G06F 12/14* (2006.01)
*G05B 19/042* (2006.01)
*G06F 21/62* (2013.01)

(52) U.S. Cl.
CPC ....... *G05B 19/0423* (2013.01); *G05B 19/042* (2013.01); *G05B 19/0426* (2013.01);
(Continued)

(58) Field of Classification Search
CPC .............................. G06F 12/14; G06F 12/1416
See application file for complete search history.

(56) References Cited

U.S. PATENT DOCUMENTS 6,345,212 B1 2/2002 Nourse
9,043,898 B2 * 5/2015 Fok Ah Chuen ... H04W 12/086
455/410

(Continued)

FOREIGN PATENT DOCUMENTS

CN 105760217 A 7/2016
JP 2000-99355 A 4/2000
(Continued)

OTHER PUBLICATIONS

Y. Hu, Y. Liu and W. Jing, "Design of SSCMP with Arbiter and Shared Data Memory Interrupt," 2007 International Symposium on High Density packaging and Microsystem Integration, 2007, pp. 1-4.*

(Continued)

*Primary Examiner* — Pierre Michel Bataille
(74) *Attorney, Agent, or Firm* — Crowell & Moring LLP (57) ABSTRACT

In a controller that operates a control program which executes sequence control or the like together with a data processing program which executes a complex arithmetic operation or the like, I/O resource information is shared with a shared memory, and an access right to the I/O resource information by the data processing program is controlled using read-in prohibited information and write-in permitted information.

5 Claims, 7 Drawing Sheets

(52) U.S. Cl.
CPC ......... *G05B 19/0428* (2013.01); *G06F 12/14* (2013.01); *G06F 12/1416* (2013.01); *G06F 21/62* (2013.01); *G06F 21/629* (2013.01)

(56) References Cited

U.S. PATENT DOCUMENTS

| | | | |
|---|---|---|---|
| 9,330,266 B2* | 5/2016 | Wang | G06F 21/60 |
| 9,361,212 B2 | 6/2016 | Engel et al. | |
| 10,229,024 B2 | 3/2019 | Das Sharma et al. | |
| 2003/0200459 A1* | 10/2003 | Seeman | G06F 21/62 |
| | | | 713/165 |
| 2005/0086447 A1* | 4/2005 | Miyamoto | G06F 21/6218 |
| | | | 711/163 |
| 2005/0203649 A1 | 9/2005 | Martin et al. | |
| 2005/0273600 A1* | 12/2005 | Seeman | G06F 21/6227 |
| | | | 713/160 |
| 2009/0113141 A1 | 4/2009 | Bullman et al. | |
| 2014/0282908 A1* | 9/2014 | Ward | H04W 12/37 |
| | | | 726/4 |

FOREIGN PATENT DOCUMENTS

| | | |
|---|---|---|
| JP | 2000-132208 A | 5/2000 |
| JP | 2003-242030 A | 8/2003 |
| JP | 2006-178818 A | 7/2006 |
| JP | 2015-127949 A | 7/2015 |
| WO | WO 2011/125178 A1 | 10/2011 |
| WO | WO-2018047412 A1 * 3/2018 ........... G05B 19/042 |

OTHER PUBLICATIONS

Pradeep K. Sinha, "Distributed Shared Memory," in Distributed Operating Systems: Concepts and Design, IEEE, 1997, pp. 231-281, doi: 10.1109/9780470544419.ch5.*
Extended European Search Report issued in counterpart European Application No. 17848357.4 dated Dec. 17, 2019 (eight pages).
Anonymous, "Programmable logic controller", Wikipedia, Aug. 28, 2016, https://en.wikipedia.org/w/index.php?title=Programmable_logic_controller&oldid=736589777, XP055651405, (12 pages).
Japanese-language Office Action issued in counterpart Japanese Application No. 2016-176877 dated Jul. 23, 2019 with unverified English translation (nine pages).
International Search Report (PCT/ISA/210) issued in PCT Application No. PCT/JP2017/018125 dated Jul. 25, 2017 with partial English translation (four (4) pages).
Japanese-language Written Opinion (PCT/ISA/237) issued in PCT Application No. PCT/JP2017/018125 dated Jul. 25, 2017 (five (5) pages).

* cited by examiner

| I/O RESOURCE INFORMATION | DATA TYPE | MEMORY ADDRESS | DATA SIZE |
|---|---|---|---|
| I/O DATA 1 | BOOL | 0x80001000 | 1 |
| I/O DATA 2 | BOOL | 0x80001001 | 1 |
| ... | ... | ... | ... |
| I/O DATA N | WORD | 0x80001108 | 8 |

ACCESS RIGHT SETTING SCREEN (1001)

| SHARING (1002) | ACCESS RIGHT (1003) | I/O RESOURCE INFORMATION (1004) |
|---|---|---|
| ✓ | R | I/O DATA 1 |
| ☐ | - | I/O DATA 2 |
| ✓ | RW | I/O DATA 3 |
| ✓ | R | I/O DATA 4 |
| ✓ | R | I/O DATA 5 |
| ✓ | RW | I/O DATA 6 |
| ☐ | - | I/O DATA 7 |
| ... | ... | ... |
| ✓ | R | I/O DATA N |

SET (1005)  CANCEL (1006)

CONTROLLER AND CONTROL MANAGEMENT SYSTEM

TECHNICAL FIELD

The present invention relates to a controller and a control management system, and particularly is suitable for application to a controller and a control management system that share control information including information of I/O resources between a control program that executes sequence control and motion control of a control system and a social infrastructure system, and a data processing program that implements a complex arithmetic operation and transmits/receives information to/from an external system such as a supervisory control system (SCADA), a manufacturing execution system (MES), and a cloud system.

BACKGROUND ART

A controller is also called a sequence control device, a motion control device, or a programmable logic controller (PLC), and control contents are described with a control device specific programming language such as ladder logic (LD language), sequential function charts (FC language), function blocks (FBD language), structured texts (ST language), and instruction lists (LD language). A program that can execute such control contents is called a "control program".

In such a controller, data processing such as a complex arithmetic operation and transmission/reception of information to/from SCADA, MES, and a cloud system may be necessary. In such data processing, programming in the control device specific language described above may be difficult, and may be described using a programming language used in an information communication field of C language, Java (registered trademark) language, or the like. A program that executes such data processing is called a "data processing program".

In order to perform data processing using control information such as execution results of the control program and information of I/O resources connecting to the controller, a method of sharing these pieces of information among a plurality of programming languages or among a plurality of MCUs is disclosed (for example, Patent Literature 1 and Patent Literature 2).

Specifically, a control device in Patent Literature 1 can execute a ladder control program corresponding to the control program described above and a Java (registered trademark) program corresponding to the data processing program described above. Necessary data to be referred to during program execution is memorized in a form of a Java (registered trademark) object, and the Java (registered trademark) program can directly access the necessary data. The ladder control program can be accessed since conversion processing is performed in an I/F unit. Accordingly, a series of processing can be configured in a plurality of programs.

Meanwhile, a FA controller in Patent Literature 2 specifically includes a shared memory, a first MCU that executes refresh processing between data stored in a memory area secured in the shared memory and input/output data stored in an input/output data memory unit, and a second MCU that operates based on a user program and operates data stored in the memory area of the shared memory. In the FA controller, the second MCU writes refresh information in which settings related to the refresh processing are described in the memory area of the shared memory, and executes the refresh processing in accordance with the refresh information written in the memory area.

PRIOR ART LITERATURE

Patent Literature

PTL 1: JP-A-2000-132208
PTL 2: WO 2011/125178

SUMMARY OF INVENTION

Technical Problem

In a data sharing method in Patent Literature 1, there is no reference to an access right from a ladder control program and a Java (registered trademark) program to a Java (registered trademark) object. For example, access control from each program to the Java (registered trademark) object is not considered.

Meanwhile, in a data sharing method in Patent Literature 2, there is no reference to an access right from each MCU to a shared memory, and access control from each MCU to each I/O resource is not considered.

The invention has been made in view of the above points, and proposes a controller and a control management system that can prevent operation of a control program from being affected even if a data processing program that transmits/receives data to/from outside is added after introducing the control program that executes predetermined control.

Solution to Problem

In order to solve such a problem, the controller in the invention includes: a control program that executes predetermined control; a data processing program that executes data processing; a shared memory that stores shared resources accessed by the control program and the data processing program separately; an access right management unit that manages access right information related to an access right to the shared memory by the control program and the data processing program; and an arbitration unit that determines whether there is an access right to the shared memory based on the access right information when the shared memory is accessed by the data processing program and permits access to the shared memory only in a case where there is an access right to the shared memory.

The control system in the invention includes: a controller including: a control program that executes predetermined control; a data processing program that executes data processing; a shared memory that stores shared resources accessed by the control program and the data processing program separately; an access right management unit that manages access right information related to an access right to the shared memory by the control program and the data processing program; and an arbitration unit that determines whether there is an access right to the shared memory based on the access right information when the shared memory is accessed by the data processing program and permits access to the shared memory only in a case where there is an access right to the shared memory; and a controller management device that displays an access right setting screen so as to input operation instructions to the access right management unit in the controller.

Advantageous Effect

According to the invention, operation of the control program can be prevented from being affected even if a data processing program that transmits/receives data to/from outside is added after introducing the control program that executes predetermined control.

DESCRIPTION OF EMBODIMENTS

Hereinafter, an embodiment of the invention will be described in detail concerning the drawings.

Figure 1:
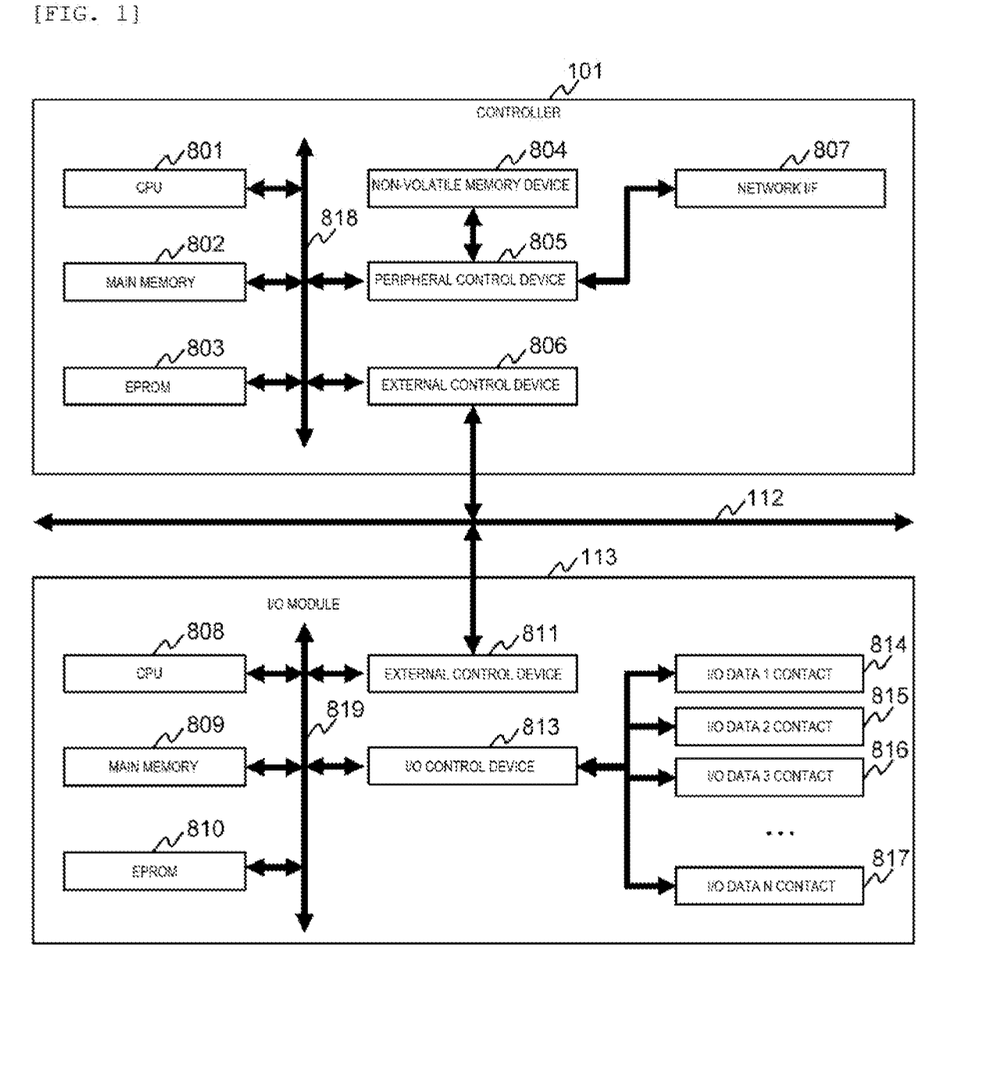
FIG. 1 is a block diagram showing an example of a hardware configuration of a controller and an I/O module according to a first embodiment.

(1) First Embodiment (1-1) Example of Hardware Configuration that is Premise of First Embodiment FIG. 1 shows an example of a hardware configuration of a controller 101 and an I/O module 113 according to the first embodiment. The controller 101 includes a CPU 801, a main memory 802, an EPROM 803, a non-volatile memory device 804, a peripheral control device 805, an external control device 806, a network interface (I/F) 807, and an internal bus 818.

The controller 101 loads an operating system (OS), various programs, and various files stored in the EPROM 803 or the non-volatile memory device 804 into the main memory 802, thereby performing various operations and the like using the CPU 801.

Meanwhile, the I/O module 113 includes a CPU 808, a main memory 809, an EPROM 810, an external control device 811, an I/O control device 813, an I/O data 1 contact 814, an I/O data 2 contact 815, an I/O data 3 contact 816, an I/O data N contact 817, and an internal bus 819.

The I/O module 113 loads various programs and various files stored in the EPROM 810 into the main memory 809, thereby performing various operations and the like using the CPU 808.

The I/O control device 813 converts a voltage applied from an external sensor or the like not shown in the I/O data 1 contact 814 or the like into digital data and memorizes the digital data in the main memory 809, and converts the digital data memorized in the main memory 809 into a voltage according to instructions of the CPU 808, and applies the voltage to the I/O data 1 contact 814 or the like.

The I/O module 113 performs input/output by a digital signal. The I/O module 113 is assumed to be a digital I/O module that performs input/output by the digital signal. However, a network I/O module that performs input/output by an analog signal and a network I/O module that performs input/output by a network packet may be used instead.

(1-2) Example of Functional Configuration According to First Embodiment

Figure 2:
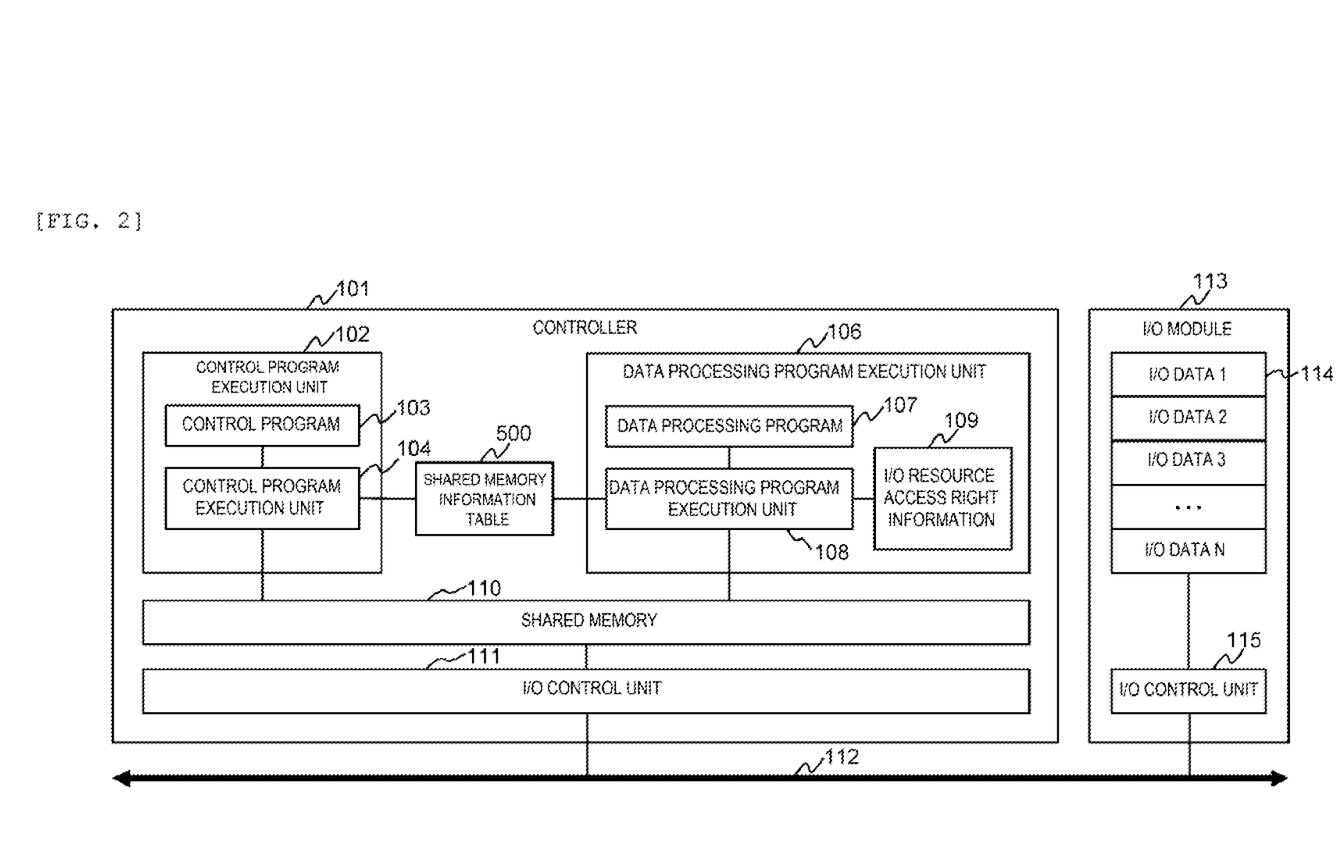
FIG. 2 is a block diagram showing an example of a functional configuration of the controller and the I/O module according to the first embodiment.

FIG. 2 shows an example of a functional configuration of the controller 101 and the like according to the first embodiment. The controller 101 shares control information including information of I/O resources between a control program that implements predetermined control and an external system. The control program is, for example, a program constituting a control system or a social infrastructure system, and executes sequence control or motion control. Meanwhile, a data processing program implements a complex arithmetic operation, and transmits/receives data to/from an external system such as a supervisory control system (SCADA), a manufacturing execution system (MES), and a cloud system. The control program and the data processing program can execute read-in and write-in of shared resources memorized in a shared memory 110 respectively at an arbitrary cycle.

The controller 101 is connected to the I/O module 113 via a bus 112. The controller 101 includes a control program execution unit 102, a shared memory information table 500, and a data processing program execution unit 106 in addition to the shared memory 110 and the I/O control unit 111.

The control program execution unit 102 includes a control program 103 and a control program execution unit 104. Execution of the control program 103 is controlled by the control program execution unit 104.

The data processing program execution unit 106 includes a data processing program 107, a data processing program execution unit 108, and I/O resource access right information 109. Execution of the data processing program 107 is controlled by the data processing program execution unit 108. The data processing program 107 can access the shared memory information table 500, which is shared resources, via a so-called API of an execution base of the data processing program 107, and confirms whether there is an access right to the data processing program 107 itself in the execution base.

The shared memory 110 and the I/O control unit 111 are connected to each other by an internal bus of the controller 101, and can exchange data with each other using, for example, a method such as a program control method (PI/O), direct memory access (DMA), or the like.

Meanwhile, the I/O module 113 includes I/O data 114 and an I/O control unit 115. The I/O data 114 and the I/O control unit 115 are connected via an internal bus of an I/O module that is not shown, and can exchange data using a method such as a program control method (PI/O), direct memory access (DMA), or the like.

The I/O control unit 111 and the I/O control unit 115 are connected to each other via the bus 112, and can exchange data using a method such as a program control method (PI/O), direct memory access (DMA), or the like.

That is, the shared memory 110 and the I/O data 114 can exchange data via a controller that is not shown, the I/O control unit 111, the bus 112, the I/O control unit 115, and an internal bus of the I/O module that is not shown using a method such as a program control method (PI/O), direct memory access (DMA), or the like.

Figure 3:
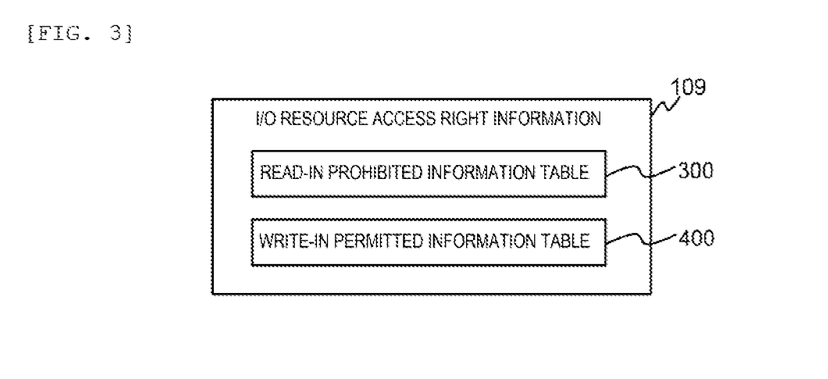
FIG. 3 is a diagram showing an example of a table configuration of I/O resource access right information shown in FIG. 2.

FIG. 3 shows an example of a table configuration of the I/O resource access right information 109. The I/O resource access right information 109 includes a read-in prohibited information table 300 and a write-in permitted information table 400.

In order to simplify setting of the access right, the read-in prohibited information table 300 defines access right information related to read-in of each I/O data by a so-called black list method. That is, the read-in prohibited information table 300 manages I/O data of which read-in is prohibited.

Meanwhile, in order to simplify setting of the access right, the write-in permitted information table 400 defines access right information related to write-in to each I/O data by a so-called white list method. That is, the write-in permitted information table 400 manages I/O data of which write-in is permitted. Details of the read-in prohibited information table 300 and the write-in permitted information table 400 will be described below.

Figure 4:
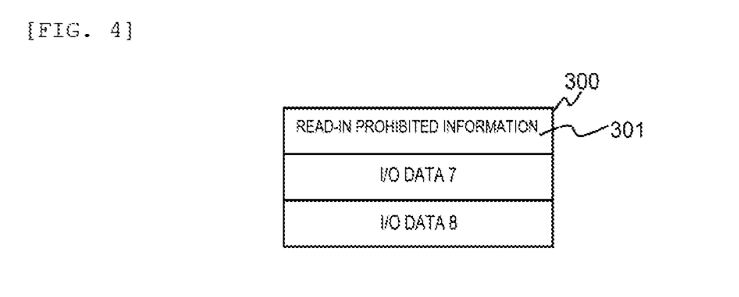
FIG. 4 is a diagram showing an example of a read-in prohibited information table shown in FIG. 3.

FIG. 4 shows an example of the read-in prohibited information table 300 shown in FIG. 3. The read-in prohibited information table 300 has an item called "read-in prohibited information 301" as a column name thereof. The I/O data 114 held by the I/O module 113 is registered in the read-in prohibited information 301. The data processing program 107 has a right to read in I/O data other than the I/O data registered as the read-in prohibited information 301.

Figure 5:
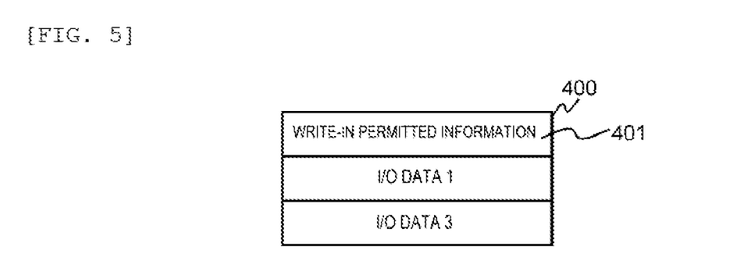
FIG. 5 is a diagram showing an example of a write-in permitted information table shown in FIG. 3.

FIG. 5 shows an example of the write-in permitted information table 400 shown in FIG. 3. The write-in permitted information table 400 includes an item called "write-in permitted information 401" as a column name thereof. The I/O data 114 held by the I/O module 113 is registered in the write-in permitted information 401. The data processing program 107 has a right to write in data as the I/O data registered as the write-in permitted information 401.

Figure 6:
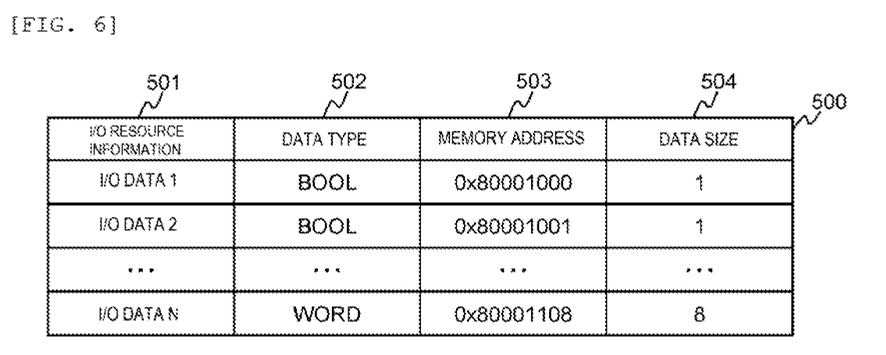
FIG. 6 is a diagram showing an example of a shared memory information table.

FIG. 6 shows an example of a shared memory information table 500 shown in FIG. 1. The shared memory information table 500 includes items called "I/O resource information 501, data type 502, memory address 503, and data size 504" as column names thereof. The I/O data 114 as I/O resources held by the I/O module 113 is registered in the I/O resource information 501. The I/O resource information 501 corresponds to each I/O data of the I/O module 113 shown in FIG. 2. A data type of the I/O resources is registered in the data type 502. Address information on the shared memory 110 of corresponding I/O data is registered in the memory address 503. A data size of a bit unit of the I/O data is registered in the data size 504.

The control program 103 and the data processing program 107 refer to the shared memory information table 500, acquire data types of I/O data as desired I/O resources, address information and data size on the shared memory 110, and execute read-in of information to corresponding I/O resources and write-in of information to corresponding I/O resources.

(1-3) Operation Example

Figure 7:
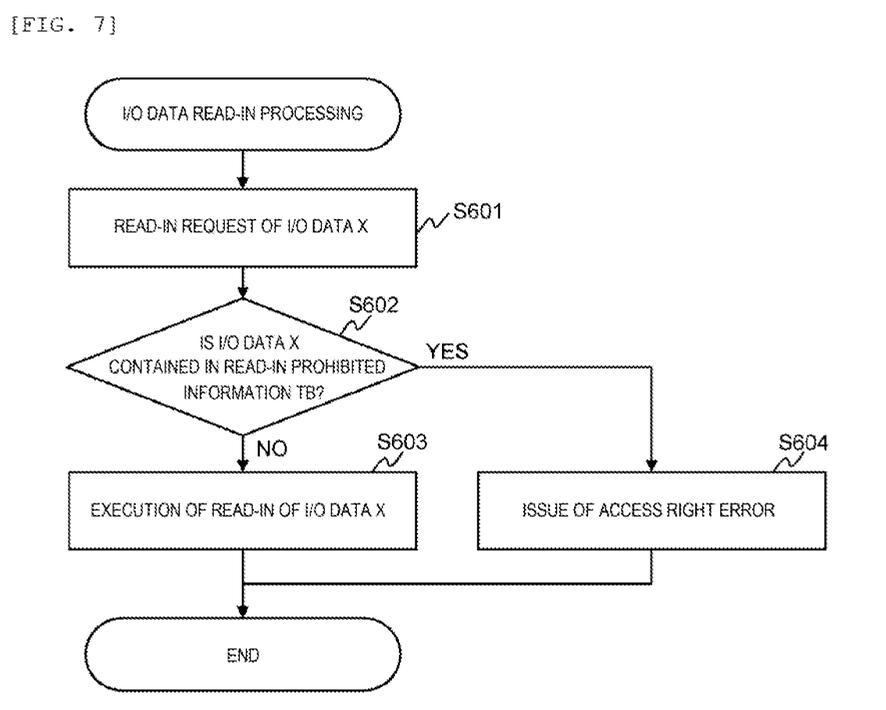
FIG. 7 is a flowchart showing an example of an operation of data read-in processing by a data processing program.

FIG. 7 is a flowchart showing an example of I/O data read-in processing. In the I/O data read-in processing, the data processing program 107 reads in I/O data X of the I/O data 114 held by the I/O module 113. The I/O data X represents I/O data of any one of the I/O data 1 to I/O data N shown in FIG. 1.

First, the data processing program 107 requests the data processing program execution unit 108 to read in the I/O data X (step S601). Upon receiving the read-in request, the data processing program execution unit 108 confirms whether the I/O data X is registered in the read-in prohibited information table 300 (step S602).

If the I/O data X is not registered in the read-in prohibited information table 300, the data processing program execution unit 108 reads in the I/O data X from the memory address on the shared memory 110 corresponding to the I/O data X with reference to the shared memory information table 500, returns a value to the data processing program 107 (step S603), and ends the processing.

Meanwhile, if the I/O data X is registered in the read-in prohibited information table 300, the data processing program execution unit 108 issues an access right error to the data processing program 107 (step S604), and ends the processing.

Figure 8:
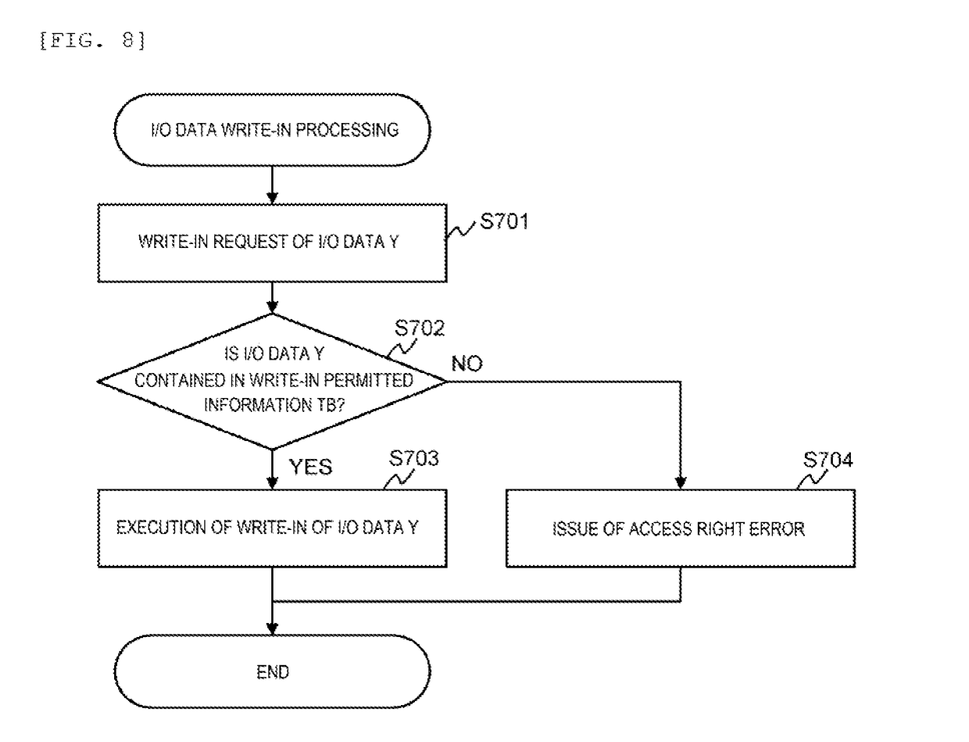
FIG. 8 is a flowchart showing an example of an operation of data write-in processing by the data processing program.

FIG. 8 is a flowchart showing an example of I/O data write-in processing. In the I/O data write-in processing, the data processing program 107 writes in I/O data Y of the I/O data 114 held by the I/O module 113.

First, the data processing program 107 requests the data processing program execution unit 108 to write in information to the I/O data Y (step S701). The data processing program execution unit 108 determines whether the I/O data Y is contained in the write-in permitted information table 400 (step S702).

When the I/O data Y is registered in the write-in permitted information table 400, the data processing program execution unit 108 writes in information in the memory address of the shared memory 110 corresponding to the I/O data Y with reference to the shared memory information table 500, returns a value to the data processing program 107 (step S703), and ends the processing.

Meanwhile, when the I/O data Y is not registered in the write-in permitted information table 400, the data processing program execution unit 108 issues an access right error to the data processing program 107 (step S704), and ends the processing.

When doing as the above, in the controller 101 capable of executing, for example, the control program 103 that executes at least one control of the sequence control and the motion control, and the data processing program 107 that implements the complex arithmetic operation and transmits/receives data between the SCADA, the MES, and the cloud system, even if the data processing program 107 is added after the control program 103 is introduced, the operation of the control program 103 can be prevented from being affected by sharing information of the I/O resources between the programs 103 and 107 and controlling the access right to the shared data of the data processing program 107.

(2) Second Embodiment

Figure 9:
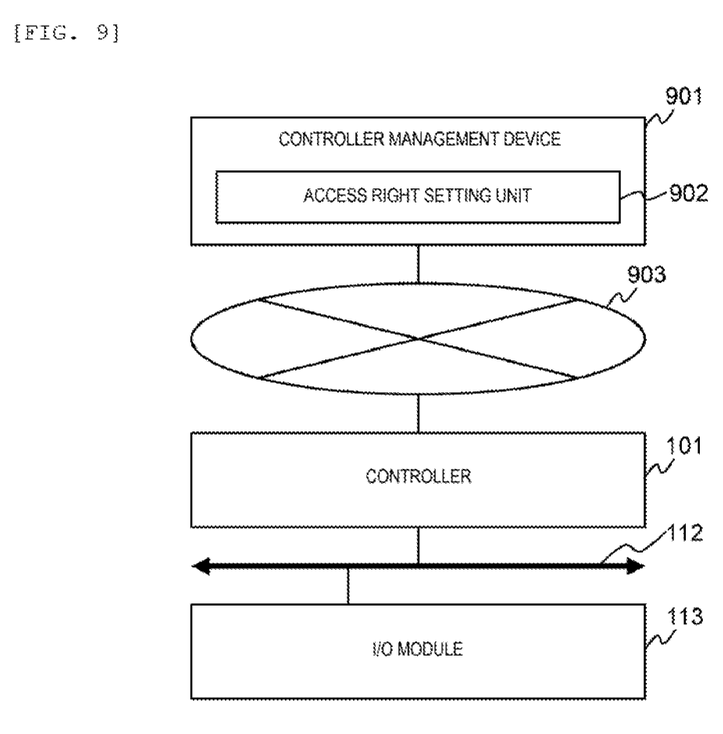
FIG. 9 is a diagram showing an example of a system configuration of a control system according to a second embodiment.

FIG. 9 is a diagram showing an example of a system configuration according to the second embodiment. In the second embodiment, in addition to the configuration of the first embodiment, a controller management device 901 is provided via an information control network 903. The controller management device 901 is, for example, a computer operated by a user who is a developer, and has a function of displaying an access right setting screen described below so as to input operation instructions to an access right management function in, for example, the controller 101.

The controller management device 901 includes an access right setting unit 902 capable of setting an access right. The controller management device 901 is connected to the controller 101 via the information control network 903 as a wired or wireless network, and exchanges information with the controller 101. Since the controller management device 901 has almost the same configuration as a normal computer, a hardware configuration thereof is not shown. Since the controller 101, the bus 112, and the I/O module 113 have the same configuration as those in the first embodiment, descriptions thereof are omitted.

Figure 10:
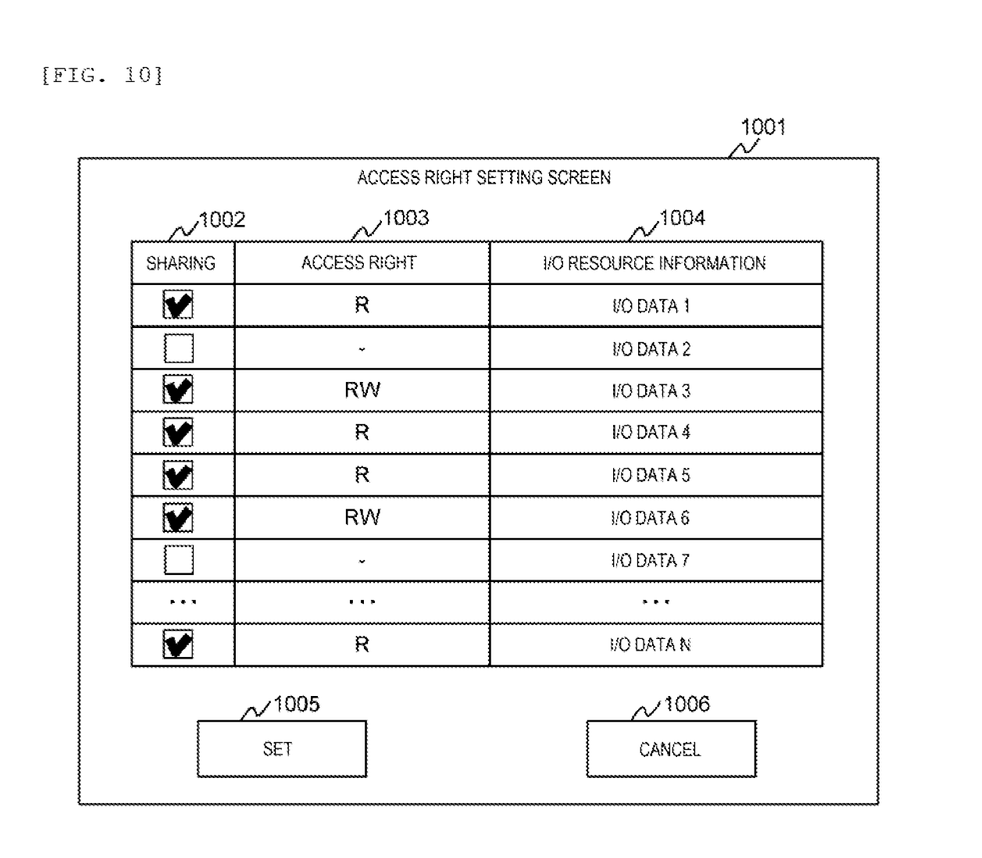
FIG. 10 is a diagram showing an example of an access right setting screen.

FIG. 10 is a diagram showing an example of a screen image of an access right setting screen 1001. The access right setting screen 1001 is displayed on a display device that is not shown by the access right setting unit 902.

The access right setting screen 1001 includes a check box 1002 showing presence or absence of sharing, an access right 1003, I/O resource information 1004, a set button 1005, and a cancel button 1006.

The user is, for example, a developer, and sets an access right based on a development environment. Based on such setting, a white list and a black list are generated for each of the read-in prohibited information table 300 and the write-in permitted information table 400 described above. The white list and black list may be imported from outside in a predetermined development environment, and if there is an access right error, for example, a compilation error can be used.

In the access right setting screen 1001, the user sets the shared I/O resources and the access right in the access right 1003, and generates information of the read-in prohibited information table 300 and the write-in permitted information table 400 based on the screen information. It is desirable that the read-in prohibited information table 300 and the write-in permitted information table 400 are set only for read-out of I/O data as default setting. In this way, it is possible to prevent the control at normal times from being particularly affected.

First, the user generates information of the I/O resources associated with the controller 101, for example, manually or by enquiring the controller 101. Next, the user checks the I/O resources shared with the data processing program 107 in the check box 1002 showing presence or absence of sharing, and sets the access right of the checked I/O resource information to the access right 1003. In this access right 1003, "R" indicates that only read-in is permitted, "W" indicates that only write-in is permitted, and "RW" indicates that both read-in and write-in are permitted.

After the access right is set as described above, when the user presses the set button 1005, the access right setting unit 902 generates the read-in prohibited information table 300 and the write-in permitted information table 400 shown in FIG. 3 and FIG. 4. When the set button 1005 is pressed in an input state shown in FIG. 20, the I/O data 2 and the I/O data 7 are registered in the read-in inhibition information table 300, while the I/O data 3 and the I/O data 6 are registered in the write-in permitted information table.

When registered as described above, the controller management device 901 transmits the generated registration contents of the read-in prohibited information table 300 and the write-in permitted information table 400 to the controller 101 via the information control network 903. The controller 101 controls access to permitted I/O resources in accordance with a procedure according to the first embodiment already described based on the registration contents of the read-in inhibited information table 300 and the write-in permitted information table 400.

According to the configurations of the first and second embodiments described above, the user can perform setting and access control of the I/O resource information and the access control information shared with the data processing program.

The I/O resource access right information 109 described above may be detected in an execution environment or the like even though tampering has been done by, for example, granting an electronic signature. In this way, even when the I/O resource access right information 109 has been tampered, it is possible to accurately detect the tampering.

In each of the embodiments described above, as an example of a method of isolating the shared memory information table 500 (hereinafter, also simply referred to as "shared resource") as shared resources, isolation of the shared resources may be realized using a so-called container technology.

Further, in each of the embodiments described above, it may be possible to set whether to synchronize with data used in control at the time of setting the shared resources/access right. In this way, it is possible to acquire parameters actually used in the control with the data processing program 107.

Further, in each of the embodiments described above, the shared resources may be memorized in a database (for example, KVS) (it may be possible to acquire not only the latest value but also history using a time series as a key, for example). In this way, not only the latest value but also a value group of the time series can be shared.

Further, in each of the embodiments described above, not only a value but also meaning information of a value such as an attribute or a type may be granted to the I/O resource access right information 109, and an attribute may be designated to the API of the execution base of the data processing program 107 to cause access or the like. In this way, even if details of control are not known, desired information can be acquired, and a reusable ratio is improved.

Further, in each of the embodiments described above, as a method of managing access frequency, for example, an API of a matter base of the data processing program 107 is not access of individual resources, and may be a batch copy of all data (for example, refresh processing) for every predetermined cycle. In this way, it is possible to prevent differences in accessing the shared resources with high frequency and affecting the control.

(3) Other Embodiments

The above embodiments are examples for describing the invention and are not intended to limit the invention only to these embodiments. The invention can be implemented in various forms without departing from the intention thereof. For example, in the above embodiments, processing of various programs is sequentially described, but the invention is not particularly limited thereto. Therefore, unless a contradiction occurs in a processing result, an order of processing may be replaced or operated in parallel.

INDUSTRIAL APPLICABILITY

The invention can be applied to a controller and a control system in which a control program and a data processing program can read and write I/O resource information at an arbitrary cycle respectively by sharing information of I/O resources via a shared memory, and a data processing program execution function can control access right of the I/O resource information by controlling read-in and write-in of the I/O resource information of the data processing program based on I/O resource access right information.

REFERENCE SIGN LIST 101 controller, 102 control program execution unit, 103 control program, 104 control program execution unit, 106 data processing program execution unit, 107 data processing program, 108 data processing program execution unit, 109 I/O resource access right information, 110 shared memory, 111 I/O control unit, 112 bus, 113 I/O module, 114 I/O data, 115 I/O control unit, 300 read-in inhibited information table, 301 read-in inhibited information, 400 write-in permitted information table, 401 write-in permitted information, 500 shared memory information table, 501 I/O resource information, 502 data type, 503 memory address, 504 data size, 801 CPU, 802 main memory, 803 EPROM, 804 non-volatile memory device, 805 peripheral control device, 806 external control device, 807 network interface, 808 CPU, 809 main memory, 810 EPROM, 811 external control device, 813 I/O control device, 814 I/O data 1 contact, 815 I/O data 2 contact, 816 I/O data 3 contact, 817 I/O data 4 contact, 901 controller management device, 902 access right setting unit, 903 information control network, 1001 access right setting screen, 1002 check box showing presence or absence of sharing, 1003 access right, 1004 I/O resource information.

The invention claimed is:

1. A controller comprising:
   a memory storing a control program that executes predetermined control and a data processing program, added to the controller after the control program is introduced, that executes data processing;
   a processor programmed to execute the control program and the data processing program;
   a shared memory that stores shared resources, which are separately accessed by the control program and the data processing program;
   wherein the processor is programmed to manage access right information related to an access right to the shared memory by the control program and the data processing program; and
   determine whether there is an access right to the shared memory based on the access right information when the shared memory is accessed by the data processing program and permit access to the shared memory only in a case where there is an access right to the shared memory;
   wherein the access right is set as a default access right related to the access right information such that only read-out of input/output (I/O) data from the shared memory by the data processing program is permitted, and
   the data processing program executes an arithmetic operation based on a value that is the I/O data read out from the shared memory based on the access right or a value of a parameter actually used in the control program acquired from the control program, and transmits/receives data to/from an external system based on a result of the arithmetic operation, even though the data processing program is added after the control program is introduced;
   wherein management of the access right information by the processor includes attaching an electronic signature to the access right information.

2. The controller according to claim 1, wherein
   a plurality of the shared resources are stored in the shared memory, and
   the processor accesses:
   a read-in prohibited information table that manages shared resources in the plurality of shared resources in which read-in is prohibited; and
   a write-in permitted information table that manages shared resources in the plurality of shared resources in which write-in is permitted.

3. The controller according to claim 1, wherein
   the control program and the data processing program execute read-in and write-in of the shared resources memorized in the shared memory respectively at an arbitrary cycle.

4. The controller according to claim 1, wherein
   the processor manages the access right information in a development environment of the control program.

5. A control system comprising:
   a controller comprising: a memory storing a control program that executes predetermined control; a processor programmed to execute the control program and a data processing program stored in the memory; a shared memory that stores shared resources accessed by the control program and the data processing program separately; wherein the processor is programmed to manage access right information related to an access right to the shared memory by the control program and the data processing program; determine whether there is an access right to the shared memory based on the access right information when the shared memory is accessed by the data processing program and permit access to the shared memory only in a case where there is an access right to the shared memory, wherein the access right is set as a default access right related to the access right information such that only read-out of input/output (I/O) data from the shared memory by the data processing program is permitted, and the data processing program executes an arithmetic operation based on a value that is the I/O data read out from the shared memory based on the access right or a value of a parameter actually used in the control program acquired from the control program, and transmits/receives data to/from an external system based on a result of the arithmetic operation, even though the data processing program is added after the control program is introduced; and
   a controller management device that displays an access right setting screen so as to input operation instructions to the access right management unit in the controller;
   wherein management of the access right information by the processor includes attaching an electronic signature to the access right information.

* * * * *